US007976377B2

(12) United States Patent
Roukis

(10) Patent No.: US 7,976,377 B2
(45) Date of Patent: Jul. 12, 2011

(54) GAMING MACHINE WITH BONUS FEATURE

(75) Inventor: George Roukis, Rosebery (AU)

(73) Assignee: Aristocrat Technologies Australia Pty Ltd. (AU)

( * ) Notice: Subject to any disclaimer, the term of this patent is extended or adjusted under 35 U.S.C. 154(b) by 140 days.

(21) Appl. No.: 11/831,568

(22) Filed: Jul. 31, 2007

(65) Prior Publication Data

US 2008/0020818 A1 Jan. 24, 2008

Related U.S. Application Data

(63) Continuation of application No. 10/640,344, filed on Aug. 12, 2003, now abandoned.

(30) Foreign Application Priority Data

Aug. 12, 2002 (AU) ................................ 2002950716

(51) Int. Cl.
*A63F 9/24* (2006.01)
*A63F 13/00* (2006.01)
*G06F 19/00* (2006.01)

(52) U.S. Cl. .......... 463/20; 273/243; 273/260; 273/256; 273/118 R; 463/7; 463/16; 463/29

(58) Field of Classification Search ........................ None
See application file for complete search history.

(56) References Cited

U.S. PATENT DOCUMENTS 4,129,304 A * 12/1978 Mager .......................... 273/243
5,116,062 A * 5/1992 Johnson ....................... 273/260
5,342,047 A * 8/1994 Heidel et al. .................... 463/29
5,560,609 A * 10/1996 Grant ............................ 273/246
5,657,991 A * 8/1997 Camarato ...................... 273/269
5,707,239 A * 1/1998 Butler ........................... 434/191
5,782,471 A * 7/1998 Bautista et al. ............... 273/256
5,803,451 A * 9/1998 Kelly et al. ............... 273/118 R
6,007,426 A * 12/1999 Kelly et al. ..................... 463/16
6,015,344 A * 1/2000 Kelly et al. ..................... 463/16
6,050,895 A * 4/2000 Luciano et al. ................... 463/7
6,126,542 A * 10/2000 Fier ................................ 463/16
6,173,955 B1 * 1/2001 Perrie et al. ................... 273/146
6,203,429 B1 * 3/2001 Demar et al. .................. 463/20
6,213,876 B1 4/2001 Moore, Jr.
6,270,411 B1 * 8/2001 Gura et al. ...................... 463/20
6,312,334 B1 * 11/2001 Yoseloff .......................... 463/25
6,328,649 B1 * 12/2001 Randall et al. .................. 463/20
6,394,901 B1 * 5/2002 Marta ............................. 463/20
6,413,161 B1 * 7/2002 Baerlocher et al. ............ 463/20
6,443,837 B1 * 9/2002 Jaffe et al. ...................... 463/16
6,551,187 B1 4/2003 Jaffe
6,599,193 B2 * 7/2003 Baerlocher et al. ............ 463/27
6,644,664 B2 11/2003 Muir et al.
6,656,047 B1 12/2003 Tarantino et al.
6,702,671 B2 3/2004 Tarantino
(Continued)

*Primary Examiner* — Paul A. D'Agostino
(74) *Attorney, Agent, or Firm* — McAndrews, Held & Malloy, Ltd.

(57) ABSTRACT

A gaming machine has a display and a game controller arranged to control images of symbols displayed on the display. The game controller is arranged to play a game wherein at least one random event is caused to be displayed on the display. If a predefined winning event occurs, the machine awards a prize. The game includes a bonus feature which, when triggered, results in the display of a plurality of devices, each of which animates to reveal a number, a prize awarded being a product of the numbers displayed by the devices.

12 Claims, 8 Drawing Sheets

U.S. PATENT DOCUMENTS

| | | | | |
|---|---|---|---|---|
| 6,746,328 | B2 | 6/2004 | Cannon et al. | |
| 6,767,284 | B1 * | 7/2004 | Koza | 463/29 |
| 7,210,997 | B2 * | 5/2007 | Hughs-Baird et al. | 463/20 |
| 2002/0043759 | A1 * | 4/2002 | Vancura | 273/139 |
| 2003/0036422 | A1 * | 2/2003 | Baerlocher et al. | 463/20 |
| 2003/0071417 | A1 | 4/2003 | Webb | |
| 2003/0078089 | A1 * | 4/2003 | Gray et al. | 463/16 |
| 2003/0114211 | A1 * | 6/2003 | White | 463/17 |
| 2003/0157977 | A1 * | 8/2003 | Thomas et al. | 463/13 |
| 2004/0048659 | A1 * | 3/2004 | Seelig et al. | 463/25 |

* cited by examiner

GAMING MACHINE WITH BONUS FEATURE

CROSS REFERENCE TO RELATED APPLICATIONS

This application claims priority as a continuation to co-pending U.S. patent application Ser. No. 10/640,344, filed on Aug. 12, 2003, entitled "A Gaming Machine with Bonus Feature", which claims priority to Australian Patent Application No. 2002950716, filed on Aug. 12, 2002, both of which are hereby incorporated by reference herein in their entirety.

FIELD OF THE INVENTION

This invention relates to a gaming machine. More particularly, the invention relates to a gaming machine and to an improvement to a game played on such a gaming machine.

BACKGROUND TO THE INVENTION

Players who regularly play gaming machines quickly tire of particular games and therefore it is necessary for manufacturers of these machines to develop innovative game features which add interest to the games. In so doing, it is hoped to keep players amused and therefore willing to continue playing the game as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games and/or game features which are popular with the players as a mechanism for improving sales, retaining customers and attracting new customers.

SUMMARY OF THE INVENTION

According to a first aspect of the invention, there is provided a gaming machine having a display means and a game control means arranged to control images of symbols displayed on the display means, the game control means being arranged to play a game wherein at least one random event is caused to be displayed on the display means and, if a predefined winning event occurs, the machine awards a prize, wherein the game includes a bonus feature which, when triggered, results in the display of a plurality of devices, each of which animates to reveal a number, a prize awarded being a product of the numbers displayed by the devices.

Preferably, the gaming machine includes a composite, bonusing feature. The composite, bonusing feature comprises a plurality of bonus features. The bonus features are independent of each other and of the base game. The bonus feature of the present invention may form part of the composite, bonusing feature but it is to be understood that the bonus feature of the present invention need not necessarily be used exclusively as a part of a composite, bonusing feature. For ease of reference the composite, bonusing feature will be referred to as a "composite feature".

The composite feature and, hence, the opportunity to participate in the bonus feature of the present invention, may be automatically triggered. Instead, a player may have to wager an additional amount, over and above a standard game wager, to be eligible for the composite feature and, as a result, the bonus feature of the present invention.

The composite feature may be triggered independently of the base game. If the composite feature applies, the control means may make a random determination as to whether or not the composite feature is to be triggered.

Should the composite feature be triggered, the control means may make a further random determination as to which bonus feature of the composite feature is to be played.

In the case of the bonus feature of the present invention, if this bonus feature is triggered by the control means then, when the bonus feature is triggered, the base game may be replaced by a second screen display.

When the bonus feature is triggered, a character, called "Lucky Devil™" (Lucky Devil is a trade mark of the Applicant), which may be common to all of the bonus features of the composite feature, may appear in the second screen display.

The devices of the bonus feature may be dice and the character may animate to perform a routine simulating the shaking of a plurality of dice, for example, three dice, in the character's hand followed by a simulation of throwing of the dice.

Preferably, to create a heightened sense of anticipation, the dice are thrown one after the other. Each die may, in the second screen display, animate to roll across a scene of the display to come to rest at a front of the scene with one face of the die visible.

The prize awarded may be the product of the numbers on the visible faces of the dice. In the case where the feature comprises three dice, if the numbers on the visible faces of at least two of the dice are the same, the prize awarded may be multiplied by a predetermined first multiple, for example, a multiple of five. If the numbers on the visible faces of all three of the dice are the same, the prize awarded may be multiplied by a second multiple greater than the first multiple, for example, a multiple of ten. In addition, the prize awarded may be multiplied by a number of lines bet and a bet per line.

According to a second aspect of the invention, there is provided a game to be played on a game playing apparatus, the game playing apparatus having a display means and a game control means arranged to control images displayed on the display means, the game including a bonus feature which, when triggered, results in the display of a plurality of devices, each of which animates to reveal a number, a prize awarded being a product of the numbers displayed by the devices.

A game playing apparatus includes one which does not require the wagering of a stake in order to play the game and further includes apparatus which is connectable to a network.

BRIEF DESCRIPTION OF THE DRAWINGS

The invention is now described by way of example with reference to the accompanying diagrammatic drawings in which:—

DETAILED DESCRIPTION OF THE DRAWINGS

Figure 1:
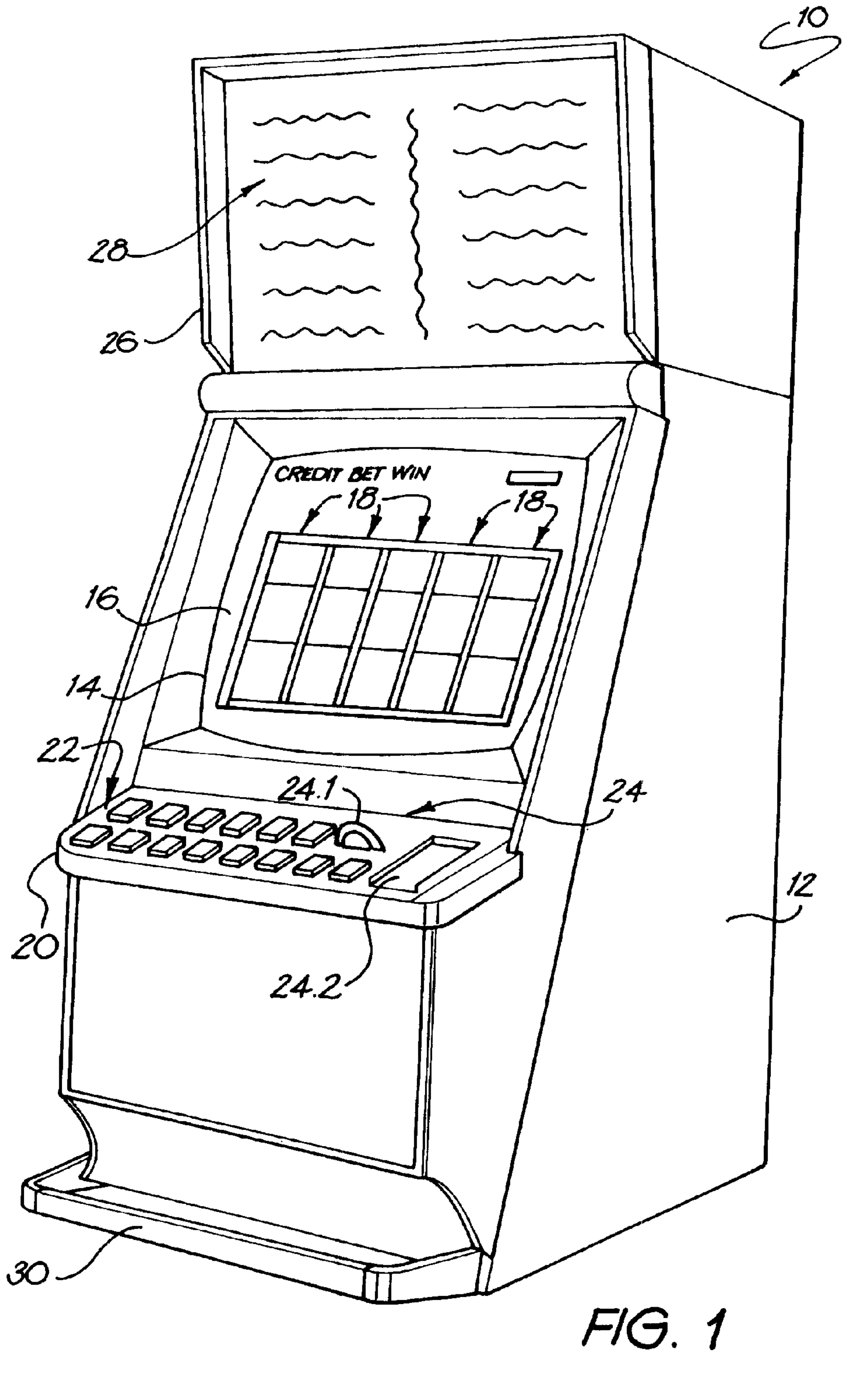
FIG. 1 shows a perspective view of a gaming machine, in accordance with an embodiment of the invention.

In FIG. 1 of the drawings, reference numeral 10 generally designates a gaming machine, including a game, in accordance with the invention. The machine 10 includes a console 12 having a video display unit 14 on which a game 16 is played, in use. The game 16 is, preferably but not necessarily exclusively, a spinning reel game which simulates the rotation of a number of spinning reels 18. A midtrim 20 of the machine 10 houses a keypad 22 of buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
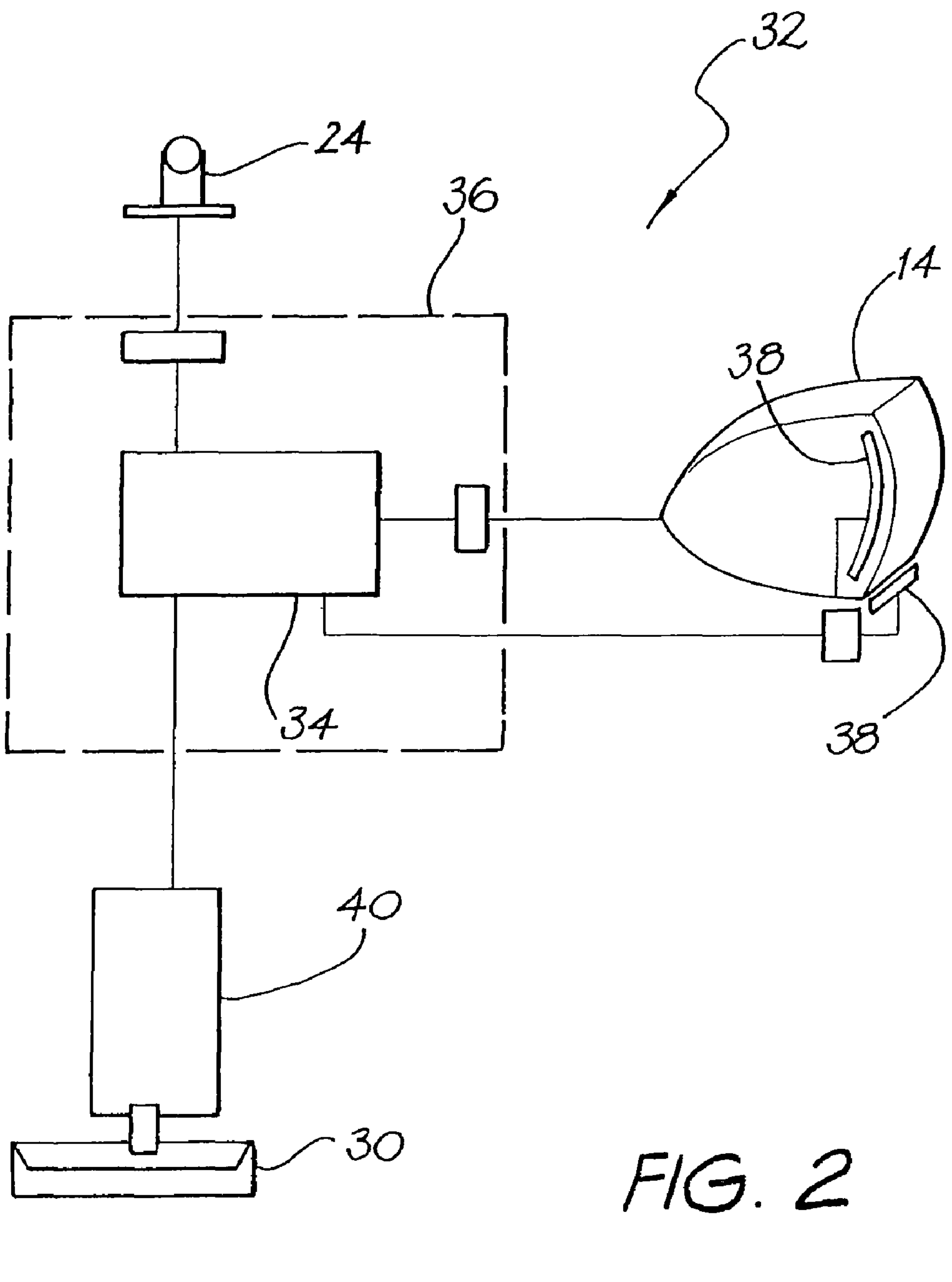
FIG. 2 shows a block diagram of a control circuit of the gaming machine.

Referring now to FIG. 2 of the drawings, a control means or control circuit 32 is illustrated. A program which implements the game and user interface is run on a processor 34 of the control circuit 32. The processor 34 forms part of a controller 36 that drives the screen of the video display unit 14 and that receives input signals from sensors 38. The sensors 38 include sensors associated with the keypad 22 and touch sensors mounted in the screen of the video display unit 14. The controller 36 also receives input pulses from the mechanism 24 to determine whether or not a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 36 drives a payout mechanism 40 which, for example, may be a coin hopper for feeding coins to the coin tray 30 to make a pay out to a player when the player wishes to redeem his or her credit.

Figure 3:
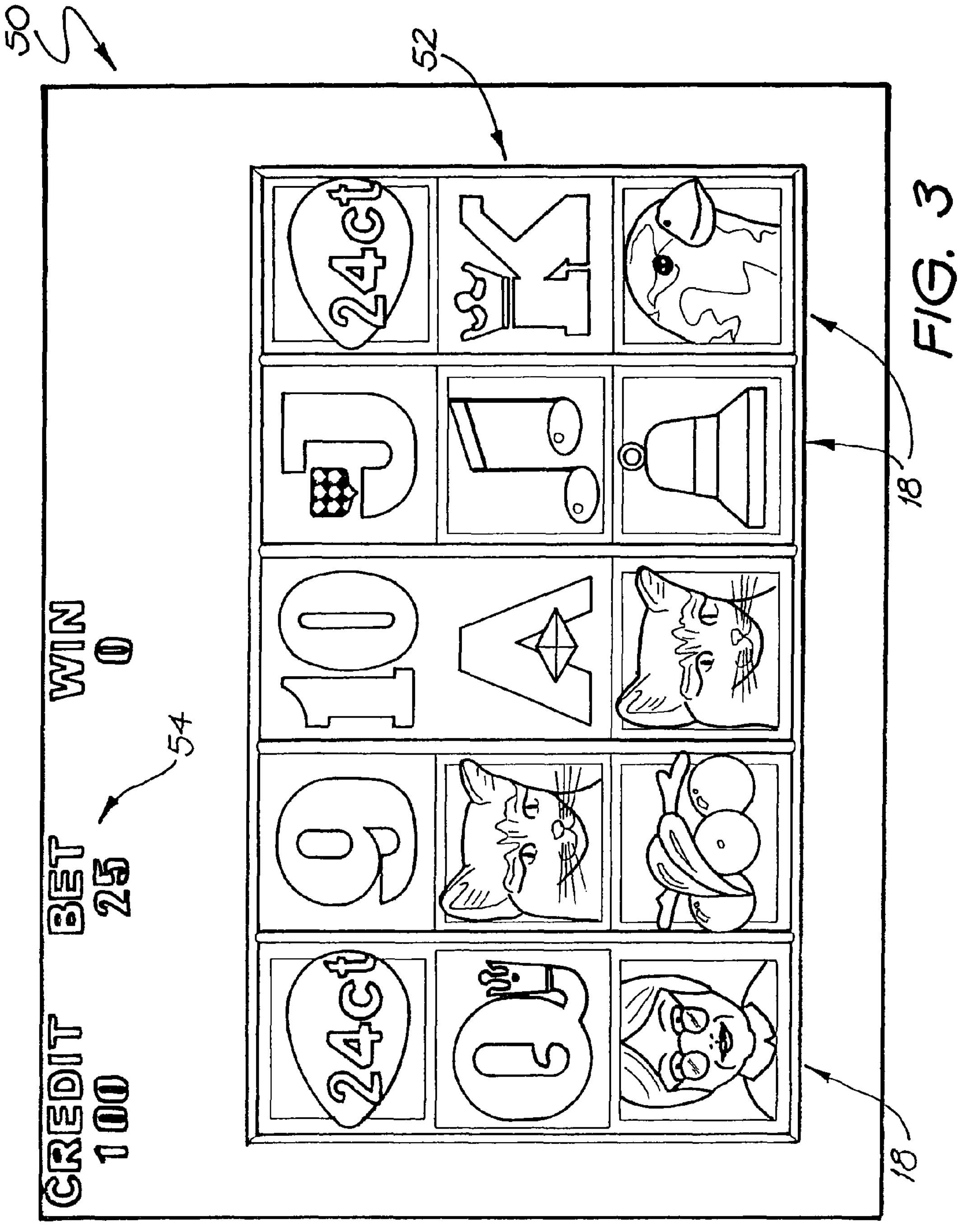
FIG. 3 shows a screen display of a base game forming part of a game played on the gaming machine of FIG. 1.

FIG. 3 of the drawings shows a screen display 50 of a base game 52 forming part of the game 16 played on the gaming machine 10. The base game 52 is a spinning reel game comprising a plurality of spinning reels 18. The example shown is the Applicant's base game called "Golden Canaries™". However, any other base game 52 could be used in the game 16. The base game 52, in fact, need not be a spinning reel game and could, for example, be a card game, a ball-type game, such as Bingo, Keno, or the like.

The game 16 includes a composite feature called "Lucky Devil™". The composite feature comprises a plurality of unrelated bonus features which are independent of and unrelated to the base game 52. The composite feature, for example, comprises five different bonus features. One of these bonus features is the subject of the present invention and is described in greater detail below with reference to FIGS. 5*a*-5*c* of the drawings.

To be eligible for the composite feature, the player must wager an additional bet. The base game 52 has 20 paylines and, assuming the player wagers one bet per line, a total of twenty credits would be required to play all 20 lines of the base game 52. However, an additional wager of five credits is wagered by the player as indicated at 54 on a bet meter on the screen display 50. The wagering of the additional bet merely gives the player eligibility to participate in the composite feature. It does not guarantee that the composite feature will occur during the playing of the base game 52.

A decision as to whether or not the composite feature is triggered is made by the controller 36 randomly.

The determination as to whether or not the composite feature is to be triggered is entirely independent of the base game 52 and also of the result of that base game. In other words, no win need appear in the base game 52 nor need any special symbols occur in the base game 52 for the composite feature to be triggered. The chances of triggering the composite feature are preferably the same regardless of which base game 52 is being played.

Figure 4:
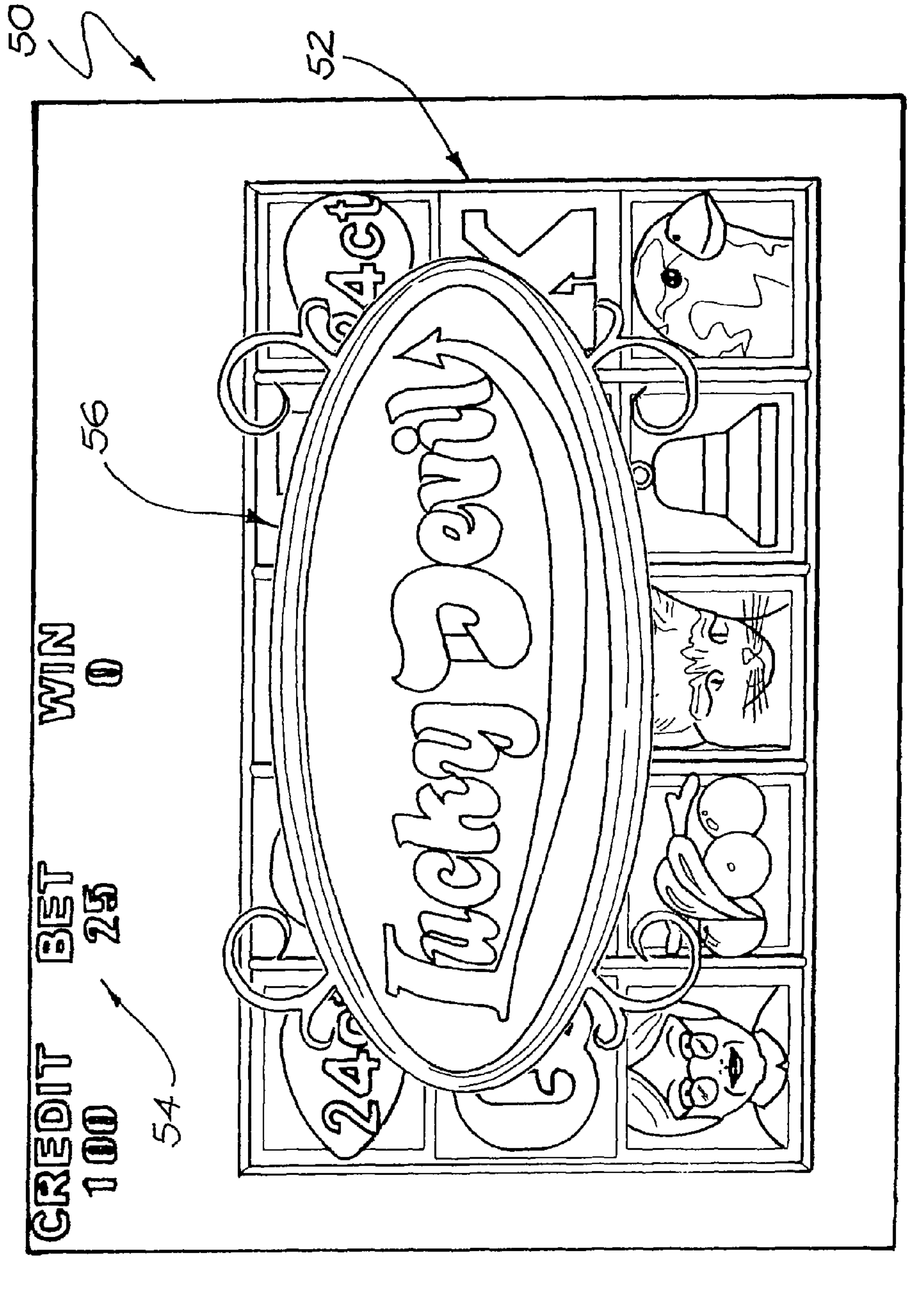
FIG. 4 shows a screen display when a composite feature is triggered on the gaming machine of FIG. 1.

Should a determination be made by the controller 36 that the composite feature is to be triggered, a special banner 56 (FIG. 4) is displayed over the base game 52 after completion of the current base game 52 in order to alert the player that one of the bonus features constituting the composite feature is about to occur.

Once again, the controller 36 makes a random determination as to which bonus feature of the composite feature is to occur.

Figure 5A:
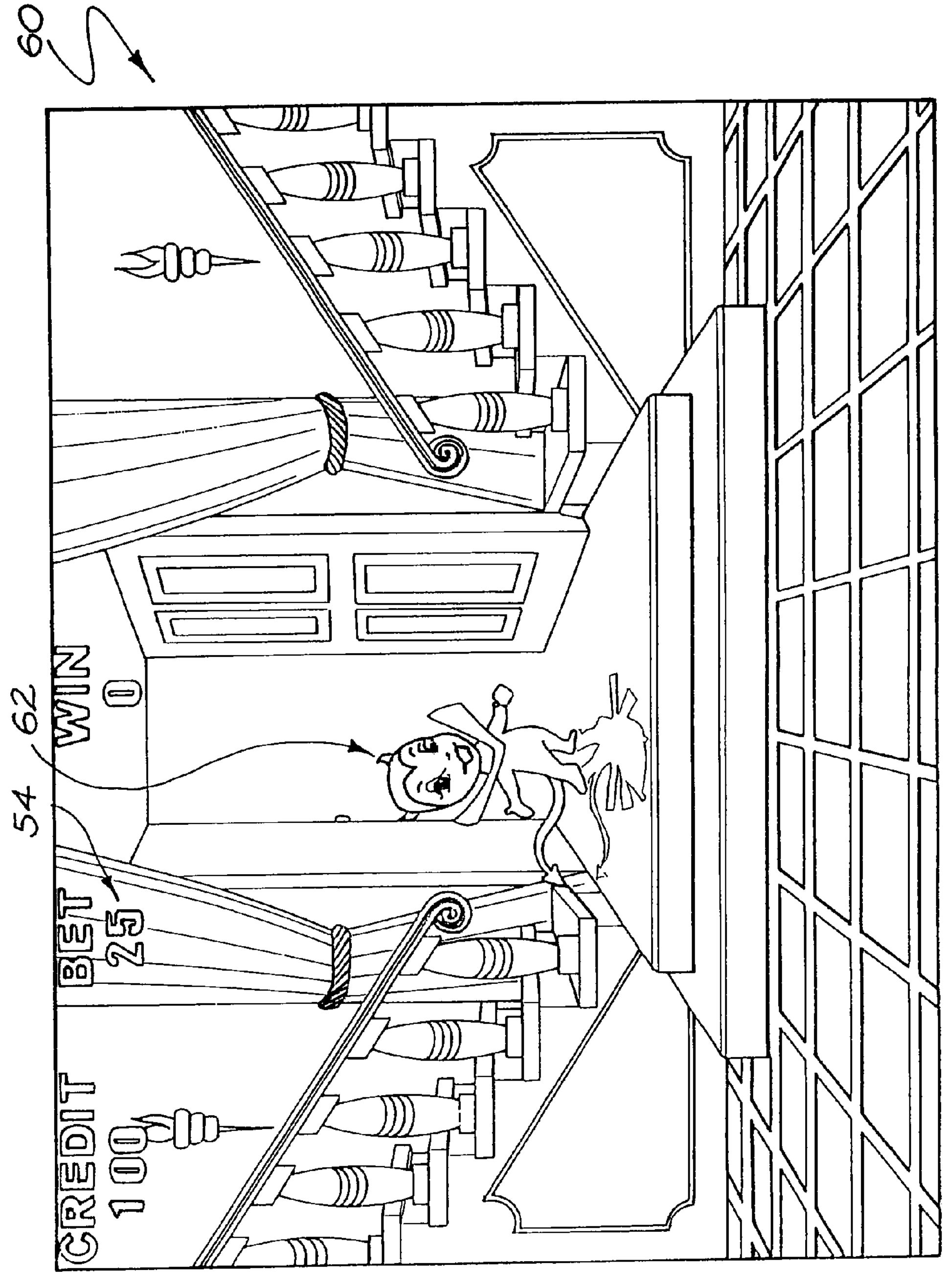
FIGS. 5*a* to 5*c* show a sequence of screen displays of a bonus feature which is one of the features of the composite feature.
Figure 5B:
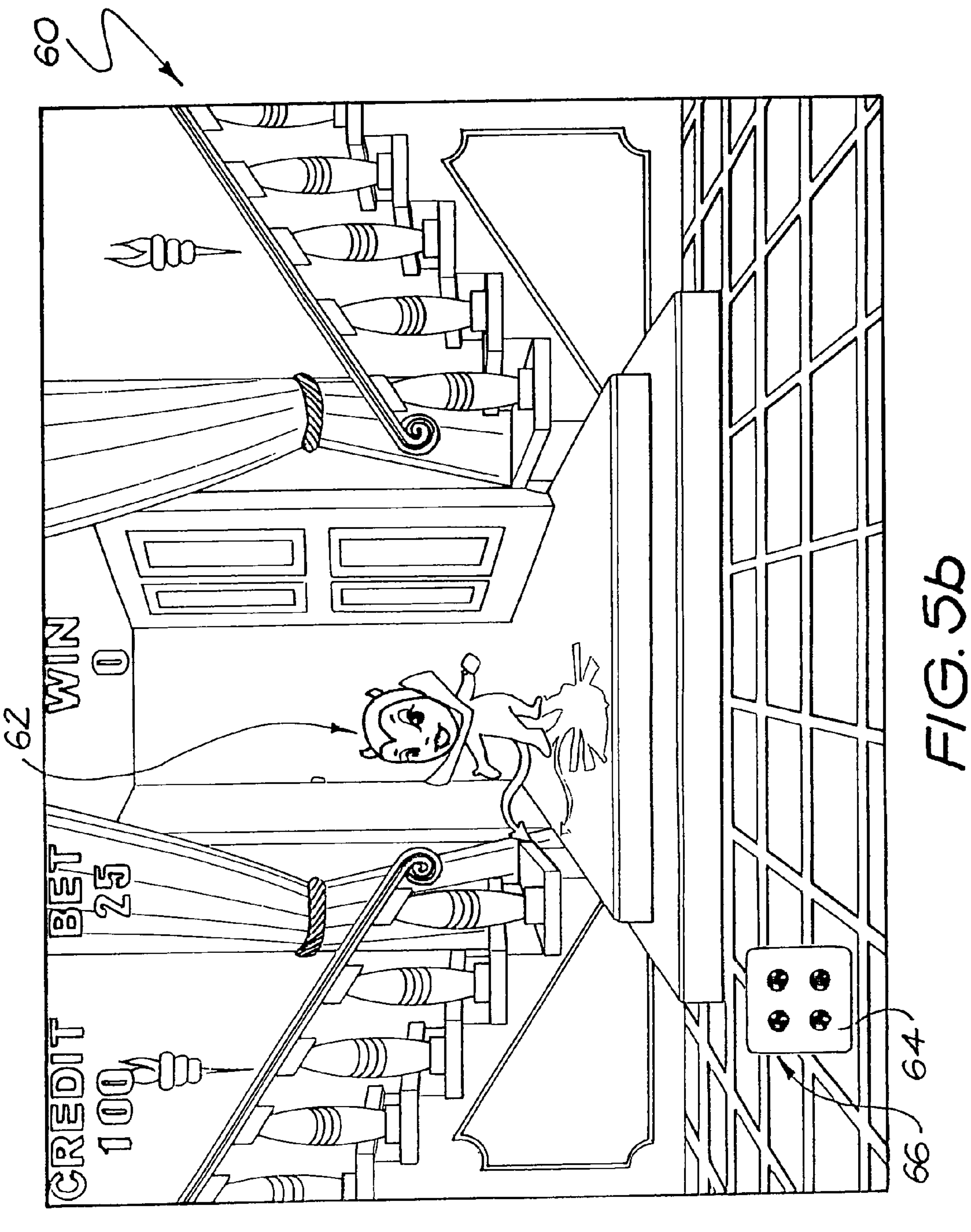
Figure 5C:
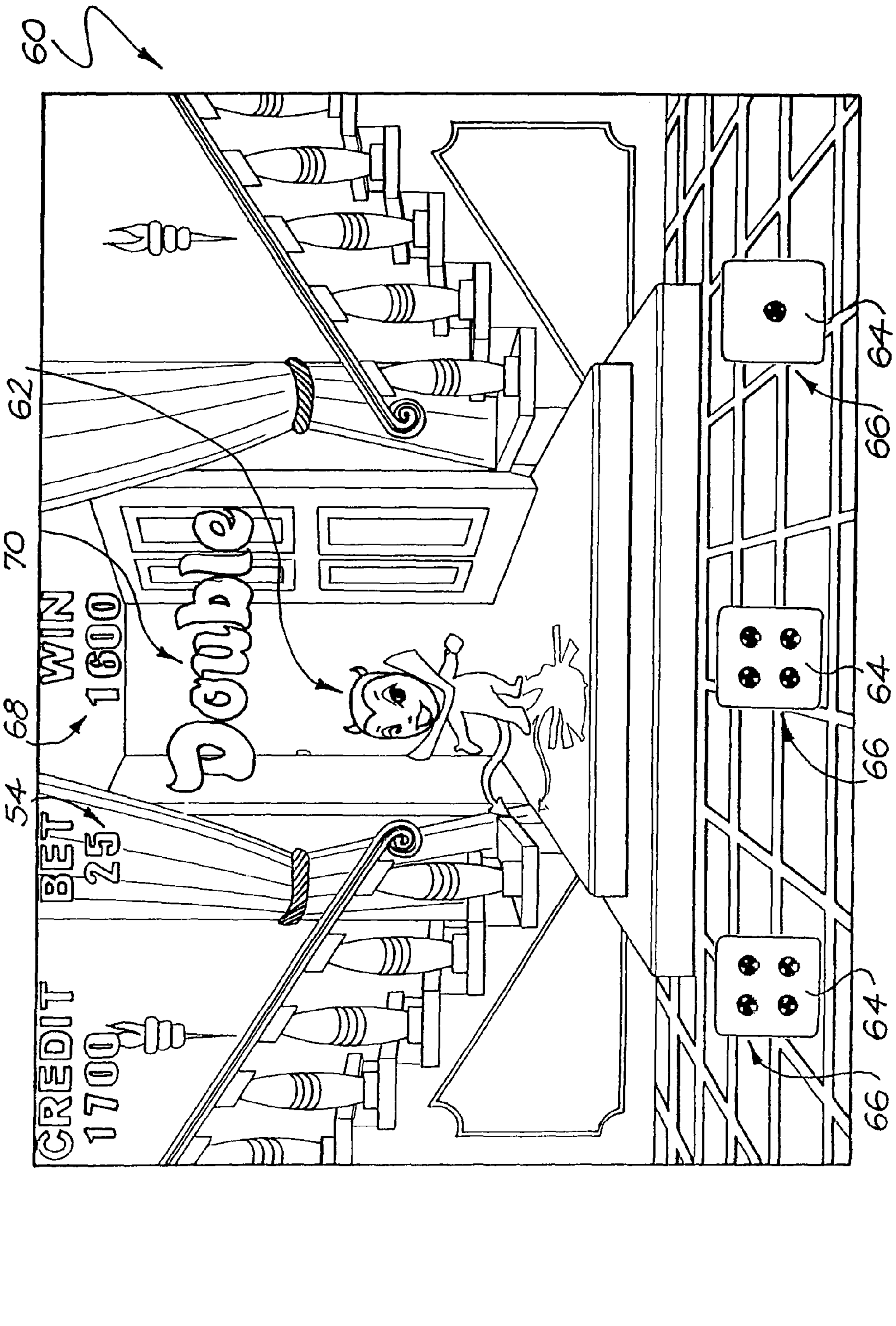
Figure 6:
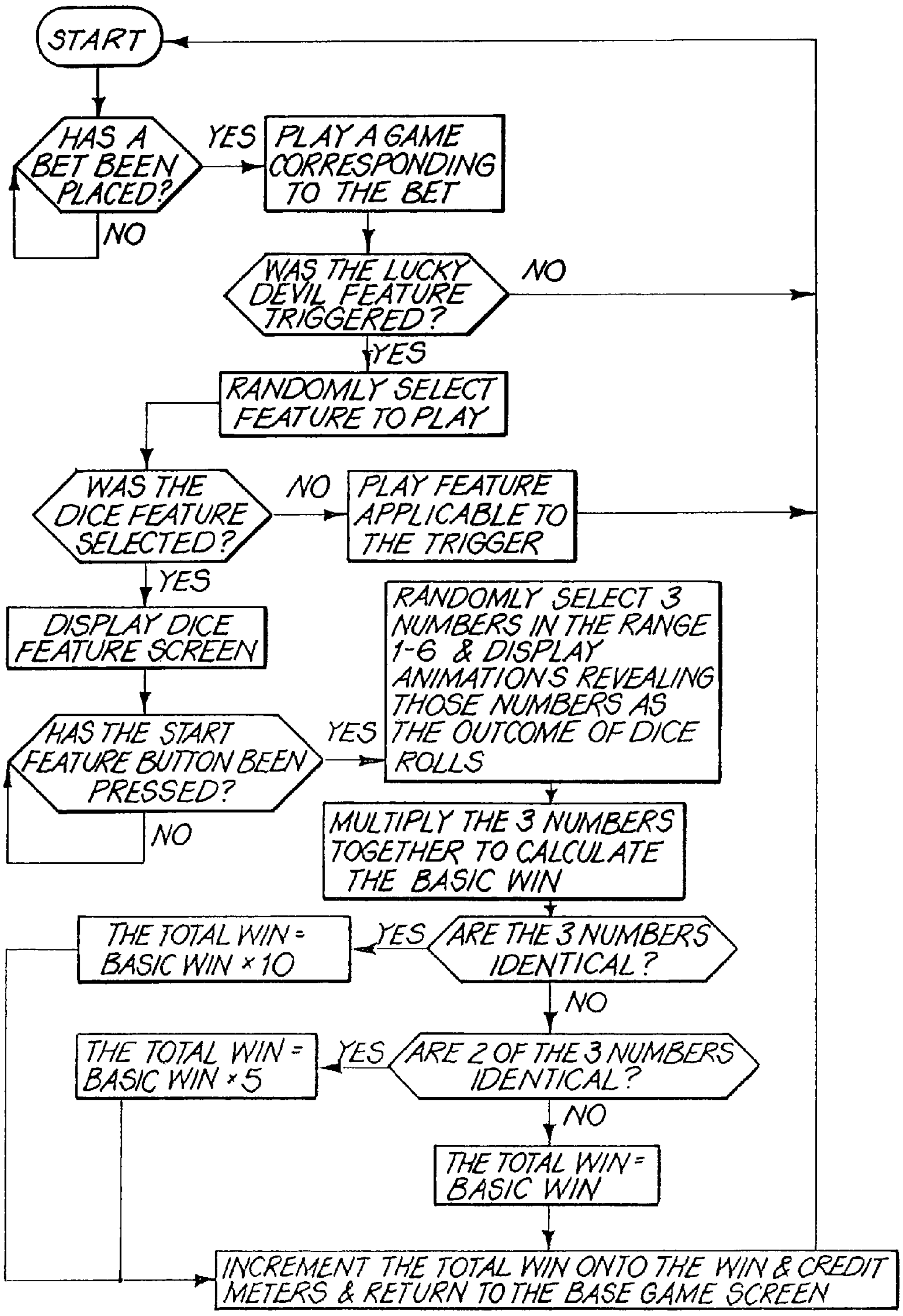
FIG. 6 shows a flow chart of the game played on the gaming machine when, firstly, the composite feature has been triggered and, secondly, the bonus feature of FIGS. 5*a* to 5*c* has been selected.

Should it be determined that the bonus feature to occur is a "dice feature", the screen display 50 is replaced by a second screen display 60 as shown in FIGS. 5*a* to 5*c* of the drawings. A message (not shown) on the screen of the video display unit 14 instructs a player to press the START FEATURE button of the keypad 22 to commence the feature.

A character 62 of a devil animates on the screen 60 to shake a plurality of dice 64, preferably three such dice 64, while waiting for the player to press the START FEATURE button. When the START FEATURE button is pressed, three outcomes, one for each die 64, are randomly selected being numbers in the range from 1 to 6. Instead, each random selection may be made just prior to the animation for that die 64.

The character 62 animates to throw a first of the dice 64 which lands with the first randomly selected number on a visible face 66 of the first die 64. This animation is repeated with the remaining dice, one after the other, until the three outcomes are shown on the screen as shown in FIG. 5*c* of the drawings. The prize awarded to the player is the product of the numbers appearing on the visible faces 66 of the dice 64. Accordingly, in the illustrated example, the basic prize is a prize of sixteen credits.

However, if the numbers on two of the faces 66 of the dice 64 are the same then the prize is multiplied by a predetermined multiplier, in this case the multiple being five. If the numbers on the visible faces 66 of all three dice 64 are the same, then the prize awarded is multiplied by a higher multiplier, for example, a multiplier of ten.

In addition, the prize awarded is multiplied by the bet made by the player. In this case, the player has bet one credit per line on 20 lines plus the additional five credits to obtain eligibility to the composite feature. Therefore, the win for the outcome illustrated in FIG. 5*c* of the drawings is:

$$4\times4\times1\times5\times20=1600$$

which is credited to a win meter 68 displayed on the screen display 60. A message 70 is also displayed on the screen display 60 to show that a double has been "thrown". Naturally, should a "triple" be "thrown", the appropriate message 70 would, instead, be displayed on the screen 60.

It is to be noted that the dice 64 are thrown one after the other so that the outcomes appear serially to heighten the sense of anticipation for the player.

In the playing of the game 16 on the gaming machine 10, a random weighted decision is made by the controller 36 as to whether or not the composite feature is to occur and, if so, which bonus feature is to be awarded. These determinations are made by the controller 36 such that the overall return to player of the gaming machine 10 is substantially unchanged in comparison with a gaming machine 10 without the composite feature.

It is an advantage of the invention that a bonus feature is provided which forms part of a composite feature. The composite feature, in turn, enhances a base game which underlies the composite feature. As a result, the player's enjoyment of the game is enhanced.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A gaming system comprising an electronic game controller, and a data storage device comprising game data, the electronic game controller and the data storage device being arranged such that the electronic game controller can process the game data to effect play of a first game and a plurality of second games, a wager being placed on said first game, each of said second games having different play characteristics with respect to each other, one of the plurality of second games is arranged to determine a value of a prize by randomly selecting a plurality of numbers during play of said one game, each said plurality of numbers being selected within a predefined range of numbers, said one game multiplying said plurality of selected numbers together to thereby obtain the value of the prize, and wherein the electronic game controller and the data storage device being further arranged to allow the electronic game controller to carryout a random selection process during play of the first game in order to randomly select one of the second games, independently of a game outcome of the first game, for play by a player, and wherein the random selection process is such that a second game is only eligible to be selected if an opportunity to play a second game has been purchased with the wager placed on the first game.

2. The gaming system as claimed in claim 1, wherein the random selection process is such that it ensures the gaming system has a return-to-player characteristic that is substantially the same as another return-to-player characteristic associated with another gaming system that does not comprise the plurality of second games.

3. The gaming system as claimed in claim 1, wherein the special game is further arranged to multiply the value of the prize by an amount wagered on a play of the first game.

4. The gaming system as claimed in claim 1, wherein the electronic game controller and the data storage device are further arranged such that the electronic game controller, subsequent to carrying out the random selection process, causes a visual display of an indication to inform a player that the one of the second games is available for play.

5. The gaming system as claimed in claim 1, wherein the special game is arranged to depict a random selection of the plurality of numbers by effecting a visual display of a plurality of die each of which represents a random selection of one of the plurality of numbers.

6. The gaming system as claimed in claim 5, wherein the special game includes a character that animates to perform a routine simulation of shaking of the plurality of dice in the character's hand followed by a simulation of throwing of the dice.

7. A method for execution in conjunction with a gaming system including an electronic game controller, and a data storage device comprising game data, said method comprising:

arranging the electronic game controller and the data storage device such that the electronic game controller can process the game data to effect play of a first game and a plurality of second games, a wager being placed on said first game, each of said second games having different play characteristics with respect to each other, one of the plurality of second games is arranged to determine a value of a prize by randomly selecting each of a plurality of numbers within a predefined range of numbers and multiplying the plurality of selected numbers together to thereby obtain the value of the prize; and allowing the electronic game controller to carryout a random selection process during play of the first game in order to randomly select one of the second games, independently of a game outcome of the first game, for play by a player, and wherein the random selection process is such that a second game is only eligible to be selected if an opportunity to play a second game has been purchased with the wager placed on the first game.

8. The method as claimed in claim 7, wherein the random selection process is such that it ensures the gaming system has a return-to-player characteristic that is substantially the same as another return-to-player characteristic associated with another gaming system that does not comprise the plurality of second games.

9. The method as claimed in claim 7, wherein the special game is further arranged to multiple the value of the prize by an amount wagered on a play of the first game.

10. The method as claimed in claim 7, wherein the electronic game controller and the data storage device are further arranged such that the electronic game controller can, subsequent to carrying out the random selection process, effect a visual display of an indication to inform a player that the one of the second games is available for play.

11. The method as claimed in claim 10, wherein the special game is arranged such that effects a depiction of randomly selecting the plurality of numbers by effecting a visual display of a plurality of dice each of which represents a random selection of one of the plurality of numbers.

12. The method as claimed in claim 11, wherein the special game including a character that animates to perform a routine simulating the shaking of the plurality of dice in the character's hand followed by a simulation of throwing of the dice.

* * * * *